(12) United States Patent
Kallat et al.

(10) Patent No.: US 7,162,559 B1
(45) Date of Patent: Jan. 9, 2007

(54) SYSTEM FOR CONTROLLING INTERRUPTS BETWEEN INPUT/OUTPUT DEVICES AND CENTRAL PROCESSING UNITS

(75) Inventors: Avinash Kallat, Marlborough, MA (US); John Phinney, Westford, MA (US); Amnon Izhar, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 148 days.

(21) Appl. No.: 11/076,618

(22) Filed: Mar. 8, 2005

(51) Int. Cl.
*G06F 13/14* (2006.01)

(52) U.S. Cl. .................................................. 710/262

(58) Field of Classification Search ......... 710/260–269
See application file for complete search history.

(56) References Cited

U.S. PATENT DOCUMENTS

| | | | | |
|---|---|---|---|---|
| 4,959,781 A | * | 9/1990 | Rubinstein et al. | 710/262 |
| 5,721,931 A | * | 2/1998 | Gephardt et al. | 710/260 |
| 5,905,897 A | * | 5/1999 | Chou et al. | 710/260 |
| 5,937,199 A | * | 8/1999 | Temple | 710/262 |
| 6,115,779 A | * | 9/2000 | Haubursin et al. | 710/262 |
| 6,574,693 B1 | * | 6/2003 | Alasti et al. | 710/262 |
| 6,845,419 B1 | * | 1/2005 | Moyer | 710/264 |
| 6,952,749 B1 | * | 10/2005 | Kim | 710/260 |
| 2004/0068598 A1 | * | 4/2004 | Sakugawa | 710/260 |

* cited by examiner

*Primary Examiner*—Rehana Perveen
*Assistant Examiner*—Trisha Vu
(74) *Attorney, Agent, or Firm*—Krishnendu Gupta; Scott A. Ouellette

(57) ABSTRACT

An interrupt controller enables multiple CPUs to control access to an increased number of interrupts. Each of a plurality of CPUs is able to block interrupts written to the interrupt controller at multiple levels. First, each CPU is able to block interrupts at the interrupt level. In other words, a CPU is able to block one or more individual interrupt requests from I/O devices from being sent to that CPU. Second, each CPU is able to block interrupts from one or more entire MSI interrupt registers from being sent to that CPU. The interrupt controller is fully programmable by the CPUs in software and thus is very flexible, as the priority of interrupts can be controlled by the CPUs according to the requirements of the CPUs based on the various operational demands of the CPUs. Any of 512 possible interrupt requests are capable of being routed to any particular one CPU, any combination of the CPUs or to all of the CPUs.

22 Claims, 3 Drawing Sheets

SYSTEM FOR CONTROLLING INTERRUPTS BETWEEN INPUT/OUTPUT DEVICES AND CENTRAL PROCESSING UNITS

FIELD OF THE INVENTION

The present invention is generally directed to a system for controlling interrupts between input/output devices and central processing units and, more particularly, to a fully programmable interrupt controller with multi-level interrupt masking capabilities.

BACKGROUND OF THE INVENTION

Message Signaled Interrupts ("MSI") is a feature in computing systems that enables devices in the system to request service from the CPU of the system by writing messages to location addresses, based on the type of service requested. Typically, the locations to which the messages are written are located in registers included in an interrupt controller which may be included in a system controller, or root complex, of the computing system. Each particular service request, or interrupt, consists of a memory write transaction to a particular location in the interrupt controller. When a CPU reads the information stored in the interrupt controller, the location address of the interrupt within the interrupt controller will identify the type of service requested by the device that sent the interrupt. Each write transaction comprises an address which indicates the memory location which, in the case of MSI, is a register in the interrupt controller, and data, which indicates a particular bit position within the register. The addresses and data are programmed by the CPU to the devices from which the interrupts are sent. Upon receiving a memory write, the interrupt controller generates an interrupt to the CPU, which reads the registers to determine what type of service is being requested by the device that initiated the memory write.

SUMMARY OF THE INVENTION

The present invention provides an interrupt controller that supports an increased number of interrupts, that has a priority scheme that is fully programmable in software and which is capable of routing any interrupt to any one or more of a number of CPUs coupled to the interrupt controller. The interrupt controller includes a plurality of MSI interrupt registers to which memory writes are generated by I/O devices coupled to the root complex of the computing system and an equal number of MSI mask registers into which bits are written by the CPUs to mask corresponding bits in the MSI interrupt registers. Each of a plurality of first level logic devices receives the contents of one of the MSI interrupt registers and the corresponding MSI mask register and outputs a signal to a second level interrupt register having at least as many bits as there are MSI interrupt registers. If a bit in a MSI interrupt register is set by a memory write from an I/O device and the corresponding bit in the corresponding MSI mask register is not set, the output from the corresponding first level logic device is set and, consequently, a corresponding bit in the second level interrupt register is set. If, the bit in the MSI interrupt register is not set or the corresponding bit in the MSI mask register is set, the output of the first level logic device is not set and the corresponding bit in the second level interrupt register is not set.

All bits of the second level interrupt register are input to each of a number of second level logic devices, each of the second level logic devices outputting an interrupt signal to a corresponding CPU. The controller also includes a corresponding number of second level mask registers, each storing the same number of bits as there are MSI interrupt registers, each of whose contents are input to a corresponding second level logic device. If a bit in the second level interrupt register is set and the corresponding bit in a second level mask register is not set, the interrupt signal output to the CPU by the second level logic device is set. If, the bit in the second level interrupt register is not set or the corresponding bit in the second level mask register is set, the interrupt signal output by the second level logic device is not set.

BRIEF DESCRIPTION OF THE DRAWINGS

These and other features of the invention will become more readily apparent from the following detailed description when read together with the accompanying drawings, in which.

DETAILED DESCRIPTION

Figure 1:
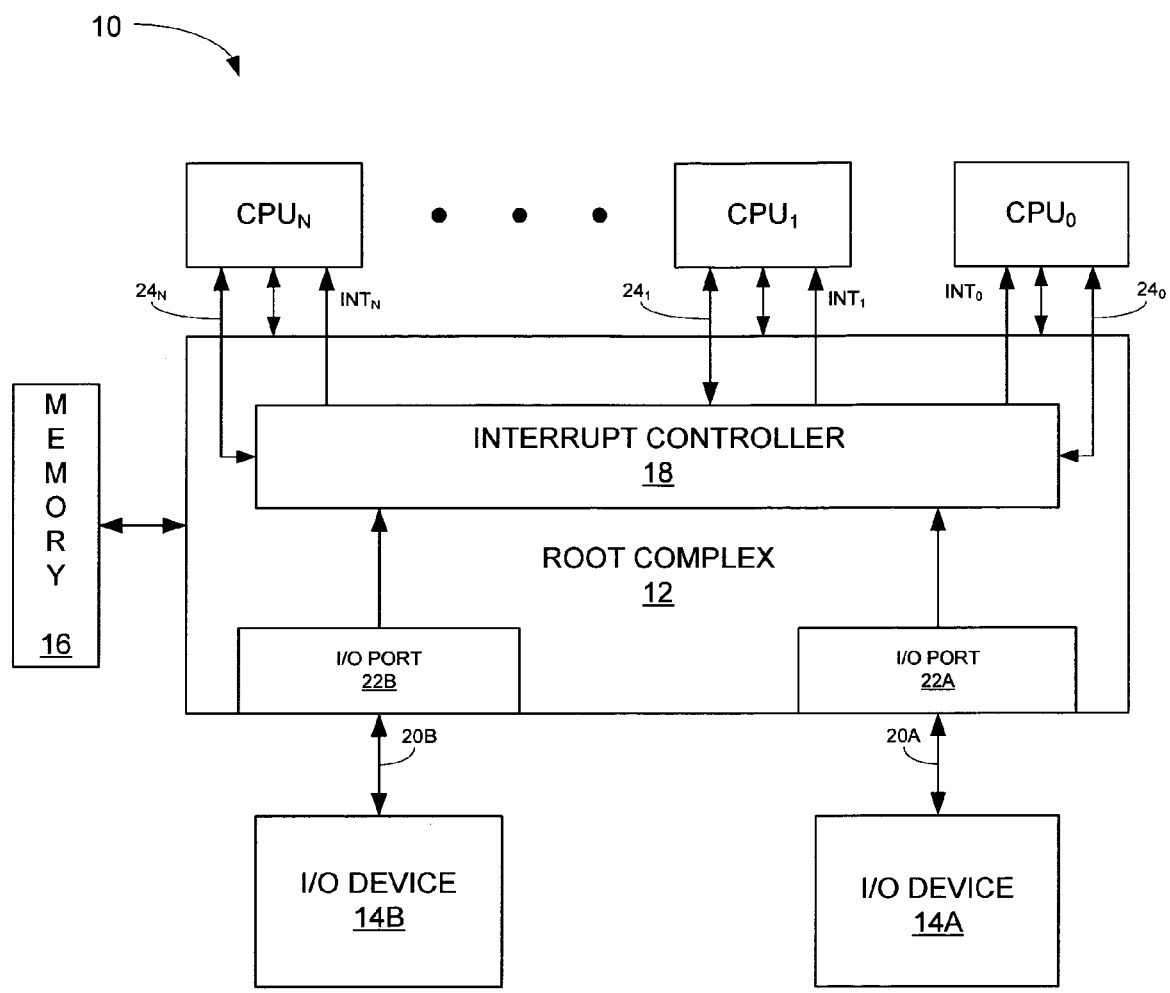
FIG. 1 is a schematic block diagram of a computing system having an interrupt controller in accordance with the present invention.

FIG. 1 is a schematic block diagram of a computing system 10 which includes a root complex 12 for facilitating communications between a number of CPUs $CPU_0$–$CPU_N$ and a number of I/O devices 14A–14B. A memory device 16 is also coupled to the CPUs $CPU_0$–$CPU_N$ and the I/O devices 14A–14B through the root complex 12. As shown in FIG. 1, each I/O device 14A and 14B is coupled to the root complex 12 via a communication link 20A and 20B, respectively, and interfaces with the root complex through an I/O port 22A and 22B, respectively. In one embodiment of the invention, the protocol under which the system 10 is the PCI-Express protocol and therefore, the links 20A and 20B are PCI-Express links and the I/O ports 22A and 22B are PCI-Express ports. The specific implementations of these links and ports are known and will not be further described herein.

The root complex 12 also includes an interrupt controller 18, which receives memory writes from the I/O devices 14A and 14B and which outputs interrupt signals $INT_0$, $INT_1$, . . . $INT_N$ to CPUs $CPU_0$, $CPU_1$, . . . $CPU_N$, respectively. In addition to communications between the CPUs $CPU_0$, $CPU_1$, . . . $CPU_N$ and the root complex 12, the CPUs $CPU_0$, $CPU_1$, . . . $CPU_N$ are coupled to the interrupt controller 18 via lines $24_0$, $24_1$, . . . $24_N$, respectively, for the purpose of writing data to and reading data from the interrupt controller 18.

As described in greater detail below, in operation, when an I/O device 14A, 14B detects an event that requires that an interrupt be generated to one or more of the CPUs, the I/O device 14A, 14B generates a memory write transaction to an address location within the interrupt controller 18. Upon receiving the memory write, the interrupt controller 18 generates an interrupt signal $INT_0$–$INT_N$, in a manner such as described below, which is input to one or more of the CPUs to enable the CPUs to address the event that triggered the need for the interrupt.

Figure 2:
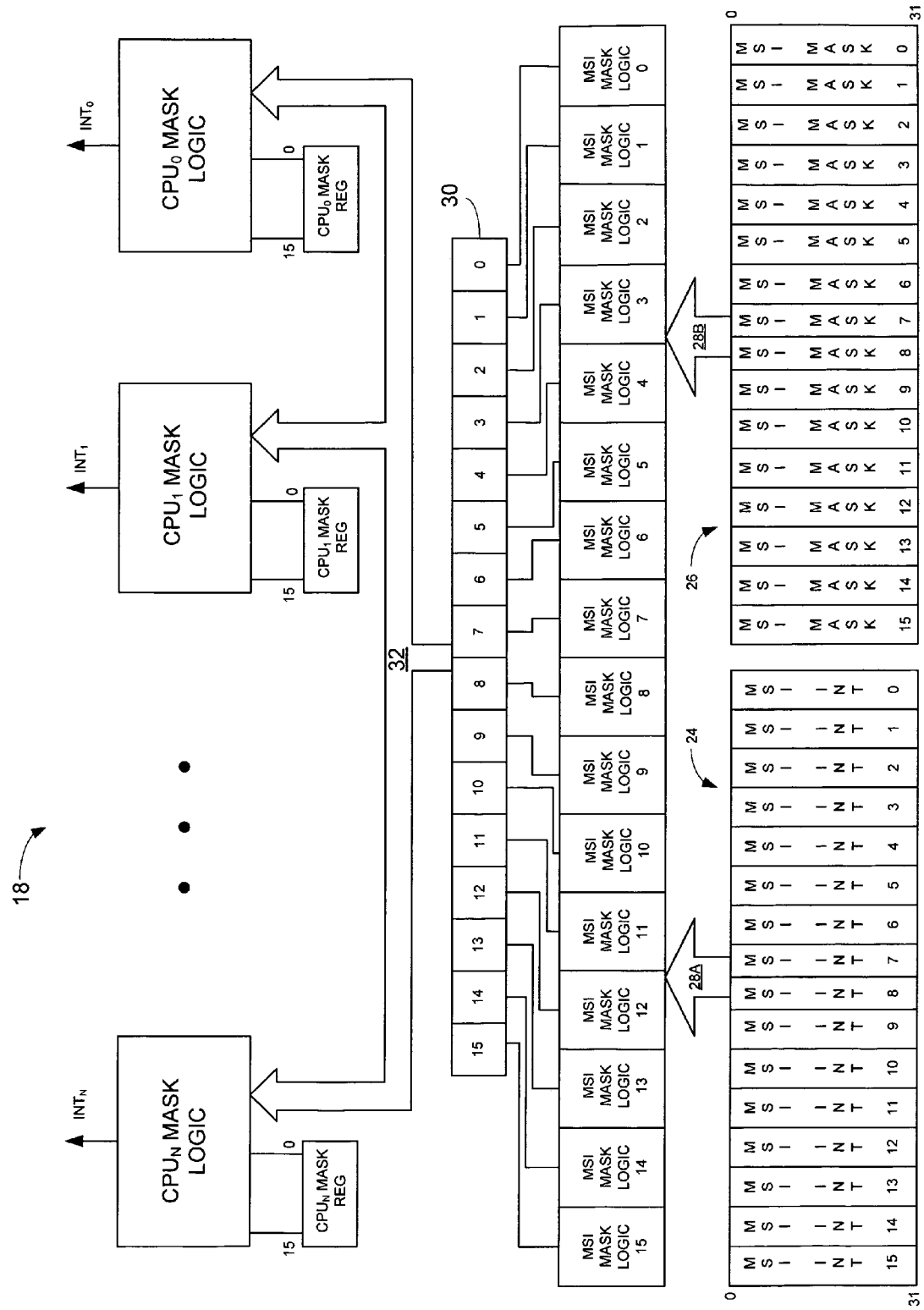
FIG. 2 is a schematic block diagram of the interrupt controller according to the present invention.
Figure 3:
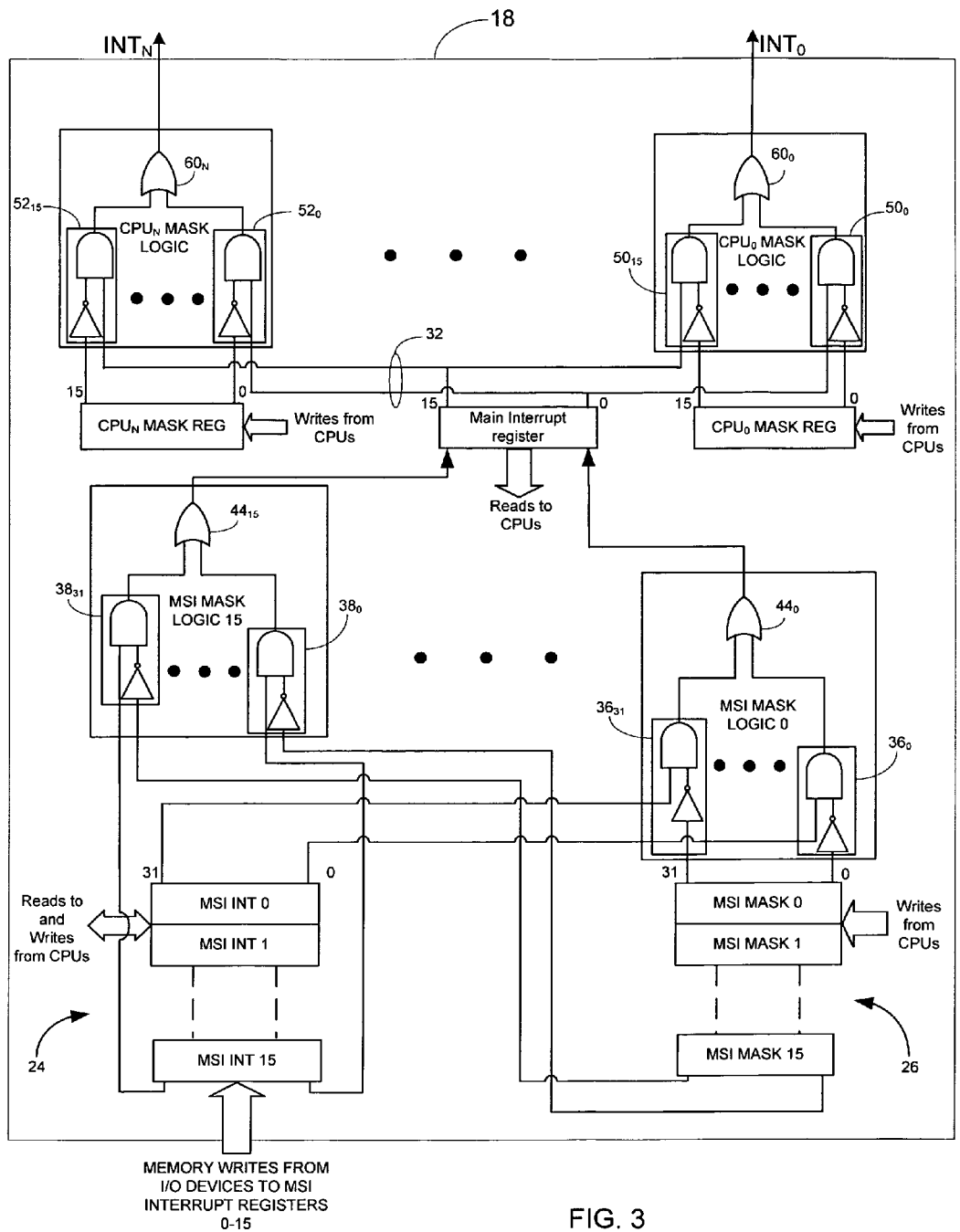
FIG. 3 is a schematic diagram showing a more detailed view of the interrupt controller according to the present invention.

Referring to FIG. 2, which is a schematic block diagram of the interrupt controller 18 and FIG. 3, which is a schematic diagram showing a more detailed view of the interrupt controller 18, the configuration and operation of the interrupt controller 18 will be described. As shown in FIG. 2, interrupt controller 18 includes a bank 24 of MSI interrupt registers MSI INT 0–MSI INT 15 and a bank 26 of MSI mask registers MSI MASK 0–MSI MASK 15. In the embodiment shown, each bank 24, 26 includes 16 registers and each register includes 32 bits, i.e., bits 0–31. Interrupt controller 18 further includes a number of MSI mask logic devices MSI MASK LOGIC 0–MSI MASK LOGIC 15. The number of MSI mask logic devices is the same as the number of MSI interrupt registers and MSI mask registers, i.e., 16. As is described in greater detail below, each bit 0–31 of each MSI interrupt register MSI SNT 0–MSI INT 15 is input to one of the MSI mask logic devices MSI MASK LOGIC 0–MSI MASK LOGIC 15 via bus 28A and each bit 0–31 of each MSI mask register MSI MASK 0–MSI MASK 15 is input to one of the MSI mask logic devices MSI MASK LOGIC 0–MSI MASK LOGIC 15 via bus 28B. More specifically, as shown in FIG. 3, bits 0–31 of MSI interrupt register MSI INT 0 are input to MSI mask logic 0 and bits 0–31 of MSI mask register MSI MASK 0 are input to MSI mask logic 0. In this way, each bit of each MSI interrupt register corresponds to the same bit in the corresponding MSI mask register. In the example above, bit 0 in MSI interrupt register MSI INT 0 corresponds with bit 0 in MSI mask register MSI MASK 0. This means that bit 0 in MSI mask register MSI MASK 0 may be used to mask the contents of bit 0 in MSI interrupt register MSI INT 0. This masking operation is described in more detail below with reference to FIG. 3.

The 1-bit output of each MSI mask logic device MSI MASK LOGIC 0–MSI MASK LOGIC 15 is input to one bit of a main interrupt register 30. As shown in FIG. 2, main interrupt register 30 includes 16 bits, bits 0–15, each receiving an output of the corresponding MSI mask logic device MSI MASK LOGIC 0–MSI MASK LOGIC 15.

Interrupt controller 18 includes a CPU mask logic device for each CPU $CPU_0$–$CPU_N$, i.e., $CPU_0$ MASK LOGIC, $CPU_1$ MASK LOGIC–$CPU_N$ MASK LOGIC. Each CPU mask logic device receives all of the bits 0–15 of the main interrupt register 30 via bus 32 as well as the bits 0–15 from a CPU mask register coupled to each CPU mask logic device $CPU_0$ MASK LOGIC, $CPU_1$ MASK LOGIC–$CPU_N$ MASK LOGIC, i.e., $CPU_0$ MASK REG, $CPU_1$ MASK REG–$CPU_N$ MASK REG. Each bit in the main interrupt register 30 corresponds to the same bit in each corresponding CPU mask register. In the example above, bit 0 in main interrupt register 30 corresponds with bit 0 in each CPU mask register $CPU_0$ MASK REG, $CPU_1$ MASK REG–$CPU_N$ MASK REG. This means that bit 0 in each CPU mask register may be used to mask the contents of bit 0 in the main interrupt register 30. This masking operation is described in more detail below with reference to FIG. 3. Based on the inputs received by each CPU mask logic device $CPU_0$ MASK LOGIC, $CPU_1$ MASK LOGIC–$CPU_N$ MASK LOGIC, each CPU mask logic device outputs an interrupt signal $INT_0$, $INT_1$ –$INT_N$ to its associated CPU.

FIG. 3 is a more detailed schematic block diagram of interrupt controller 18. In order to provide a more detailed description of the interrupt controller 18, portions of the controller as shown in FIG. 2 have been expanded while redundant portions of FIG. 2 have been omitted. During normal operation of the I/O devices 14A and 14B, certain events may occur that require the I/O device to notify one or more of the CPUs that the event has occurred. When such an event occurs, the I/O device 14A, 14B generates a memory write transaction to one of the bits of one of the MSI interrupt registers MSI INT 0–MSI INT 15. Each bit in the bank 24 of registers corresponds to a particular event such that, when a bit is written to, the CPU or CPUs that read the bit after receiving an interrupt signal, will know, by the address of the bit, what event the bit is signaling. The address of each bit in the bank 24 of MSI interrupt registers MSI NT 0–MSI INT 15 is programmed into each I/O device prior to the operation of the I/O device.

In one embodiment of the invention, the memory write transaction consists of an address portion, which identifies the particular MSI interrupt register MSI INT 0–MSI INT 15 that is being written to, and a data portion, which identifies the bit within the written-to register which will be set by the memory write transaction. Since each register MSI INT 0–MSI INT includes 32 bits, the lowest 5 bits of the data portion, i.e., bits 4:0, indicate which one of bits 0–31 in the register will be set. For example, if bits 4:0 of the data portion of a memory write transaction are "00111", bit 7 of the particular register to which the memory write transaction was addressed would be set. In this embodiment, because there are 16 MSI interrupt registers, each including 32 bits, a total of 512 different events can be signaled to one or more of the CPUs in the computing system 10.

Each MSI mask logic device MSI MASK LOGIC 0–MSI MASK LOGIC 15 includes 32 input logic gate devices, each for receiving one bit from one of the MSI interrupt registers and the corresponding bit from the corresponding MSI mask register. As shown in FIG. 3, MSI MASK LOGIC 0 includes 32 input logic gate devices $36_0$–$36_{31}$. Each logic gate device 36 includes an AND gate having an inverter connected to one of its inputs. In the case of logic gate device 360, bit 0 from MSI interrupt register MSI INT 0 is input to the non-inverted input of the AND gate and bit 0 of the MSI mask register MSI MASK 0 is input to the inverted input. Each bit 0–31 of MSI interrupt register MSI INT 0 is input to the non-inverted input of each logic gate device 36 and each bit 0–31 of MSI mask register MSI MASK 0 is input to the inverted input of each logic gate device 36. In the case of logic gate device $36_{31}$, bit 31 from MSI interrupt register MSI INT 0 is input to the non-inverted input of the AND gate and bit 31 of the MSI mask register MSI MASK 0 is input to the inverted input. For simplicity in the figure, only logic gate devices $36_0$ and $36_{31}$ are shown having the respective bits from the MSI interrupt register MSI INT 0 and MSI mask register MSI MASK 0. However, it will be understood that each of bits 1–30 are also coupled to logic gate devices (not shown) in a similar manner as bits 0 and 31.

Likewise, MSI mask logic device MSI MASK LOGIC 15 is shown having logic gate devices $38_0$–$38_{31}$, with bit 0 from MSI interrupt register MSI INT 15 being input to the non-inverted input of the AND gate and bit 0 of MSI mask register MSI MASK 15 being input to the inverted input of logic gate device $38_0$. Furthermore, bit 31 from MSI interrupt register MSI INT 15 is input to the non-inverted input of the AND gate and bit 31 of MSI mask register MSI MASK 15 is input to the inverted input of logic gate device $38_{31}$. Bits 1–30 of MSI interrupt register MSI INT 15 and MSI mask register MSI MASK 15 are similarly coupled to respective logic gate devices (not shown).

It will also be understood that bits 0–31 of MSI interrupt registers MSI INT 1–MSI INT 14 and bits 0–31 of MSI mask registers MSI MASK 1–MSI MASK 14 are coupled to their respective MSI mask logic devices MSI MASK LOGIC 1–MSI MASK LOGIC 14 (not shown).

The outputs of the AND gates of each of the logic gate devices $36_0$–$36_{31}$ are input to an OR gate $44_0$, the outputs of the AND gates of each of the logic gate devices $38_0$–$38_{31}$ are input to an OR gate $44_{15}$, and the outputs of the AND gates in MSI mask logic devices MSI MASK LOGIC 1–MSI-MASK LOGIC 14 are input to respective OR gates (not shown).

The output of each of the OR gates 44 of MSI mask logic devices MSI MASK LOGIC 0–MSI MASK LOGIC 15 is input to a respective bit in main interrupt register 30. For example, the output of OR gate $44_0$ of MSI mask logic device MSI MASK LOGIC 0 is input to bit 0 of main interrupt register 30; the output of OR gate $44_{15}$ of MSI mask logic device MSI MASK LOGIC 15 is input to bit 15 of main interrupt register 30; and the output of the OR gates in each of MSI MASK LOGIC 1–MSI MASK LOGIC 14 is input to bits 1–14, respectively, of main interrupt register 30.

As described above, interrupt controller 18 includes one CPU mask logic device for each CPU that is part of computing system 10. Each of the CPU mask logic devices $CPU_0$ MASK LOGIC–$CPU_N$ MASK LOGIC includes logic gate devices $50_0$–$50_{15}$, in the case of $CPU_0$ MASK LOGIC, and $52_0$–$52_{15}$ in the case of $CPU_N$ MASK LOGIC. The number of logic gate devices is the same as the number of bits in the main interrupt register 30 and the same as the number of registers in MSI interrupt register bank 24. Each logic gate device includes an AND gate having one inverted input and receives corresponding bits from the main interrupt register 30 and the CPU mask register CPU MASK REG. Specifically, logic gate device $50_0$ of CPU mask logic device $CPU_0$ MASK LOGIC receives bit 0 of the $CPU_0$ MASK REG at the inverted input and bit 0 of the main interrupt register 30 at the non-inverted input. Furthermore, bit 15 from the main interrupt register 30 is input to the non-inverted input of the AND gate and bit 15 of $CPU_0$ MASK REG 15 is input to the inverted input of logic gate device $50_{15}$. Bits 1–14 of main interrupt register 30 and CPU mask register $CPU_0$ MASK REG are similarly coupled to respective logic gate devices (not shown) in $CPU_0$ MASK LOGIC.

Likewise, bit 0 of main interrupt register 30 is input to the non-inverted input of the AND gate in logic gate device $52_0$ of $CPU_N$ MASK LOGIC and bit 0 of $CPU_N$ MASK REG is input to the inverted input. Furthermore, bit 15 of main interrupt register 30 is input to the non-inverted input of the AND gate in logic gate device $52_{15}$ of $CPU_N$ MASK LOGIC and bit 15 of $CPU_N$ MASK REG is input to the inverted input. Bits 1–14 of main interrupt register 30 and CPU mask register $CPU_N$ MASK REG are similarly coupled to respective logic gate devices (not shown) in $CPU_N$ MASK LOGIC. Each CPU mask logic device is coupled to all of the bits of the main interrupt register 30 and its own CPU mask register in a similar manner.

The output of each AND gate of each logic gate device 50, 52 in each CPU mask logic device $CPU_0$ MASK LOGIC-$CPU_N$ MASK LOGIC is input to a corresponding OR gate, $60_0$–$60_N$. The output of each OR gate is the interrupt signal $INT_0$–$INT_N$ that is sent to the respective CPU, $CPU_0$–$CPU_N$.

In operation, when an I/O device generates a memory write transaction to notify one or more of the CPUs of a particular event, the bit corresponding to that event is set in the appropriate MSI interrupt register in the MSI interrupt register bank 24. For example, if a particular event required an I/O device 14A, 14B to notify one or more CPUs, the memory write transaction generated by the I/O device would have an address portion indicating one of MSI interrupt registers MSI INT 0–MSI INT 15 and the data portion would indicate the particular bit (0–31) within that register. In this example, the bit set by the memory write transaction is bit 0 of MSI interrupt register MSI SNT 0, i.e., bits 4:0 of the data portion of the memory write transaction to MSI interrupt register MSI INT 0 are "00000". Also, for the purpose of this example, the corresponding bit 0 in the corresponding MSI mask register MSI MASK 0 is "0". Since the input to the non-inverted input of the AND gate of logic gate device $36_0$ is "1" and the input to the inverted input of the AND gate is "0", the output of the logic gate device $36_0$ is "1". Thus, the output of OR gate $44_0$ is high, and the bit 0 of main interrupt register 30 is "1". In the case of the main interrupt register, bit 0 being "1" indicates that bit set by the I/O device is in MSI interrupt register MSI INT 0.

If bits 0 of each of the CPU mask registers $CPU_0$ MASK REG–$CPU_N$ MASK REG are "0", then the input to the non-inverted input of the AND gate of each of logic gate devices $50_0$ and $52_0$ is "1" and the input to the inverted input of the AND gate of each logic gate device is "0". Therefore, the output of each logic gate device $50_0$ and $52_0$ is "1" and the output of each of OR gates $60_0$ and $60_N$ is "1". Thus, the interrupt signals $INT_0$ and $INT_N$ are "1" and notify the associated CPU of the presence of a bit that has been set in one of the MSI interrupt registers MSI INT 0–MSI INT 15.

At this point, the CPUs $CPU_0$ and $CPU_N$ are only aware that a bit has been set in the MSI interrupt register bank 24, but the CPU must determine which bit has been set, and which type of event is being signaled by the I/O device. Therefore, in order to determine which bit has been set, the CPUs that received the INT signal first read the contents of main interrupt register 30 to determine which MSI interrupt register has a bit that has been set. As described above, each bit in the main interrupt register 30 corresponds to one of the MSI interrupt registers MSI INT 0–MSI INT 15. Accordingly, because bit 0 in the main interrupt register 30 is set, the CPU or CPUs determine that MSI interrupt register MSI INT 0 includes the bit that has been set by the I/O device. The CPU then reads the contents of MSI interrupt register MSI INT 0 to determine which bit has been set. In this example, bit 0 is set, so the CPU is able to determine what event had occurred that caused the I/O device to notify the CPU. The CPU is then able to take the appropriate action.

The interrupt controller 18 also enables the CPUs $CPU_0$–$CPU_N$ to block interrupts that are being sent to the CPUs by the I/O devices. The interrupt controller 18 enables the CPUs to block the interrupts at multiple levels. First, the CPUs are able to block individual interrupts from reaching the CPUs through MSI mask registers MSI MASK 0–MSI MASK 15 and MSI MASK LOGIC 0–MSI MASK LOGIC 15. Second, the CPUs are able to block entire MSI interrupt registers from sending interrupts to the CPUs through CPU mask registers $CPU_0$ MASK REG–$CPU_N$ MASK REG and CPU mask logic devices $CPU_0$ MASK LOGIC–$CPU_N$ MASK LOGIC.

A CPU would block the propagation of an interrupt through the interrupt controller 18 for several reasons, such as for prioritizing applications or operations, to enable the CPU to only be notified of certain, more critical interrupts over less critical interrupts. In an instance when a CPU needed to block the interrupt represented by bit 0 in MSI interrupt register MSI INT 0, the CPU will set the corresponding bit in the corresponding MSI mask register, i.e., bit 0 in MSI mask register MSI MASK 0. This causes the inverted input to the AND gate of logic gate device $36_0$ to be "0" and consequently, the output of the OR gate $44_0$, as well as bit 0 of the main interrupt register 30 to be "0". With bit 0 of the main interrupt register 30 a "0" and bit 0 of CPU mask registers $CPU_0$ MASK REG–$CPU_N$ MASK REG a "0", the output of each of logic gate devices $50_0$ and $52_0$ is "0". Thus, the outputs $INT_0$–$INT_N$ from OR gates $60_0$–$60_N$, respectively, are also "0", and the CPUs are not notified of the presence of the set bit 0 in MSI interrupt register MSI INT 0.

In an instance when a CPU needed to block an entire MSI interrupt register from propagating interrupts, the CPU sets the bit in its CPU mask register that corresponds to the MSI interrupt register that is to be blocked from sending interrupts to the CPU. For example, if $CPU_0$ needed to block MSI interrupt register MSI INT 15 from sending interrupts, it would write a "1" into bit position 15 in CPU mask register $CPU_0$ MASK REG. When an I/O device 14A, 14B generates a memory write transaction to any bit in MSI interrupt register MSI INT 15, as described above, bit 15 in main interrupt register 30 will be set by the output of MSI mask logic device MSI MASK LOGIC 15 (assuming that bit 15 in MSI mask register MSI MASK 15 is not set). Therefore, the input to the non-inverted input of the AND gate in logic gate device $50_{15}$ is "1" and the input to the inverter of logic gate device $50_{15}$ from CPU mask register $CPU_0$ MASK REG is "1". Accordingly, the output of the logic gate device $50_{15}$ is "0" and, if none of the other logic gate devices 50 have outputs of "1", the output $INT_0$ of OR gate $60_0$ is "0". Therefore no interrupt signal from MSI interrupt register MSI INT 15 is sent to $CPU_0$. In the event that another of the logic gate devices 50 has an output of "1", meaning that a different MSI interrupt register that has not been blocked by $CPU_0$ by setting the corresponding bit in CPU mask register $CPU_0$ MASK REG has a set bit, the output $INT_0$ of $CPU_0$ MASK LOGIC will be "1". However, when $CPU_0$ reads the contents of the main interrupt register 30, it will ignore any bits in the main interrupt register 30 that correspond to MSI interrupt registers that have been blocked by $CPU_0$ by setting the corresponding bit in CPU MASK REG.

In addition to the CPUs being able to read from the main interrupt register 30 and the MSI interrupt registers MSI SNT 0–MSI INT 15 and write to the CPU mask registers $CPU_0$ MASK REG–$CPU_N$ MASK REG and MSI mask registers MSI MASK 0–MSI MASK 15, the CPUs are also able to write to the MSI interrupt registers MSI INT 0–MSI INT 15 for the purpose of clearing bits in the MSI interrupt registers. This would occur when, for example, a particular interrupt has been handled and the bit signifying that interrupt must be cleared. In one embodiment of the invention, a write of "1" by a CPU to one or more set bits in a MSI interrupt register will clear those bits in the register. However, a write of "1" by a CPU to one or more bits in the MSI mask registers will set those bits and a write of "0" by a CPU to one or more bits in the MSI mask registers will clear those bits.

If a CPU sets a bit in a MSI mask register, when the corresponding bit in the corresponding MSI interrupt register is set, the corresponding bit in the main interrupt register 30 will be cleared if no other bits in that MSI interrupt register are set. This is because the output of the logic gate device corresponding to that bit will go to "0", resulting in the output of the OR gate of the corresponding MSI mask logic device going to "0". If other bits in that MSI interrupt register are set, then the bit in the main interrupt register 30 remains set only if the corresponding bits in the corresponding MSI mask register are at 0. If, while a bit in a MSI interrupt register is set and the corresponding bit in the corresponding MSI mask register is set, the bit in the MSI mask register is cleared by a CPU, the set bit in the MSI interrupt register will be allowed to propagate through the corresponding MSI mask logic device to the main interrupt register. Likewise, if a set bit in a CPU mask register is cleared while the corresponding bit in the main interrupt register is set, the set bit in the main interrupt register will be allowed to propagate through the corresponding CPU mask logic device.

As set forth above, a write of "1" by a CPU to a particular bit in a MSI interrupt register will result in that particular bit being cleared. The bit in the main interrupt register 30 corresponding to the MSI interrupt register will be cleared if no other bits in that MSI interrupt register are set. If any other bits in the MSI interrupt register are set, then the bit in the main interrupt register 30 remains set only if the corresponding bits in the MSI Mask register are at 0.

Accordingly, the present invention provides an interrupt controller that enables multiple CPUs to control access to an increased number of interrupts. Each of a plurality of CPUs is able to block interrupts written to the interrupt controller at multiple levels. First, each CPU is able to block interrupts at the interrupt level. In other words, a CPU is able to block one or more individual interrupt requests from I/O devices from being sent to that CPU. Second, each CPU is able to block interrupts from one or more entire MSI interrupt registers from being sent to that CPU. The interrupt controller is fully programmable by the CPUs in software and thus is very flexible, as the priority of interrupts can be controlled by the CPUs according to the requirements of the CPUs based on the various operational demands of the CPUs. In the present invention, any of the possible 512 interrupt requests are capable of being routed to any particular one CPU, any combination of the CPUs or to all of the CPUs.

The system and method described herein may find applicability in any computing or processing environment. The system and method may be implemented in hardware, software, or a combination of the two. For example, the system and method may be implemented using circuitry, such as one or more of programmable logic (e.g., an ASIC), logic gates, a processor, and a memory.

The system and method may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system and method. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the data framer interface. The system and method also may be implemented as a machine-readable storage medium, configured with a computer program, where, upon execution, instructions in the computer program cause a machine to operate to perform the functions of the system and method described above.

Implementations of the system and method may be used in a variety of applications. Although the system and method is not limited in this respect, the system and method may be implemented with memory devices in microcontrollers, general-purpose microprocessors, digital signal processors (DSPs), reduced instruction-set computing (RISC), and complex instruction-set computing (CISC), among other electronic components.

Implementations of the system and method may also use integrated circuit blocks referred to as main memory, cache memory, or other types of memory that store electronic instructions to be executed by a microprocessor or store data that may be used in arithmetic operations.

The invention may be embodied in other specific forms without departing from the spirit or essential characteristics thereof. For example, the number of interrupt requests may vary and the configuration of the MSI interrupt registers may vary to accommodate the same number of interrupt requests as described or a different number of interrupt requests. Instead of the 16 32-bit MSI interrupt registers, 8 64-bit MSI registers could be utilized to support 512 interrupt requests. In such an embodiment, the number of MSI mask registers would be appropriately altered to be the same as the number of MSI interrupt registers and the number of bits in the main interrupt register 30 would be altered accordingly to 8 bits. In order to write to each of the number M of bits in each MSI interrupt register, the least significant number Y of bits of the data portion of the memory write transaction are used to identify the particular bit of an MSI interrupt register, where Y is determined according to the equation:

$$Y = \frac{\log M}{\log 2};$$

where $M=2^X$ and X is a positive whole number.

It will be understood that the invention may support any number of interrupt requests, as long as the number and bit size of the MSI interrupt registers and the MSI mask registers are adjusted accordingly, and the bit size of the main interrupt controller is also adjusted to accommodate the number of MSI interrupt registers.

The invention is also able to support any number of CPUs that require access to the interrupt requests sent to the interrupt controller by the I/O devices and any number of I/O devices that can write interrupt requests to the interrupt controller. Furthermore, although a particular implementation of the MSI mask logic devices, CPU mask logic device and logic gate devices is described, it will be understood that any implementation of these devices may be contemplated, provided that the operation of the overall interrupt controller is as described. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. An interrupt controller for interrupts generated by one or more I/O devices to one or more CPUs coupled to the one or more I/O devices through a system controller device, the interrupt controller comprising:
   a number N of first level interrupt registers, each having a number M of bits, each bit corresponding to a particular interrupt;
   a number N of first level mask registers, each having a number M of bits, each bit corresponding to a particular interrupt, each of the N first level mask registers corresponding to one of the N first level interrupt registers and each of the M bits in each of the N first level mask registers corresponding to one of the M bits in the corresponding first level interrupt register;
   a number N of first level mask logic devices, each receiving the M bits from a corresponding one of the N first level interrupt registers and the M bits from the corresponding one of the N first level mask registers and outputting a first level signal;
   a second level interrupt register having N bits, each for storing the first level signal output by a different one of the first level mask logic devices;
   a number X of second level mask registers, the number X corresponding to the number of CPUs coupled to the one or more I/O devices through the system controller device, each of the second level mask registers having a number N of bits; and
   a number X of second level mask logic devices, each of the X second level mask logic devices receiving the N bits from the second level interrupt register and the N bits from a corresponding one of the X second level mask logic devices and outputting an interrupt indication signal to a corresponding one of the CPUs;
   wherein the state of each of the N bits in the second level interrupt register, as set by the first level signal output by each first level mask logic devices, is based on the states of the M bits in each corresponding first level interrupt register and the corresponding M bits in the corresponding first level mask register; and
   wherein the state of the interrupt indication signal output by each of the second level mask logic devices is based on the states of the N bits in the corresponding second level mask register and the N bits in the second level interrupt register.

2. The interrupt controller of claim 1 wherein, upon an I/O device detecting an event for which a particular interrupt will be generated by the I/O device, the I/O device generates a memory write transaction to set a particular bit of the M bits of a particular first level register of the N first level registers, the memory write transaction including an address portion for identifying the particular first level interrupt register of the N first level interrupt registers and a data portion for identifying the particular bit of the M bits of the particular first level register that corresponds to the particular interrupt being generated.

3. The interrupt controller of claim 2 wherein a number Y bits of the data portion of the memory write transaction are used to identify the particular bit of the M bits of the particular first level register that corresponds to the particular interrupt being generated.

4. The interrupt controller of claim 3 wherein the number M is 32 and the number Y is 5.

5. The interrupt controller of claim 4 wherein bits 4:0 of the data portion of the memory write transaction are used to identify the particular bit of the M bits of the particular first level register that corresponds to the particular interrupt being generated.

6. The interrupt controller of claim 5 wherein bits 4:0 of the data portion of the memory write transaction are used to identify one of bits 0 through 31 of the particular first level register that corresponds to the particular interrupt being generated.

7. The interrupt controller of claim 3 wherein each of the N bits of the second level interrupt register identifies one of the N first level interrupt registers and, upon receiving an interrupt indication signal, the associated CPU reads the N bits from the second level interrupt register to identify which of the N first level interrupt registers has at least one of its M bits set.

8. The interrupt controller of claim 7 wherein the associated CPU reads the M bits of the identified one of the N first level interrupt registers to identify at least one interrupt that corresponds to at least one set bit in the identified one of the N first level interrupt registers.

9. The interrupt controller of claim 3 wherein each of the one or more CPUs prevents the notification of the presence of particular interrupts generated by the one or more I/O devices to itself or others of the one or more CPUs by setting bits in the first level mask registers that correspond to bits in corresponding first level interrupt resisters that identify the particular interrupts.

10. The interrupt controller of claim 3 wherein each of the one or more CPUs prevents the notification of the presence of interrupts generated in one of the first level interrupt registers by the one or more I/O devices to itself by setting one of the N bits in the second level mask register, associated with the CPU, that corresponds to the first level interrupt register whose interrupts are to be prevented from being made known to the CPU.

11. The interrupt controller of claim 3 wherein the number Y bits are the least significant bits of the data portion of the memory write transaction, and the number Y is determined by the equation:

$$Y = \frac{\log M}{\log 2}.$$

12. An interrupt controller for interrupts generated by one or more I/O devices to one or more CPUs coupled to the one or more I/O devices through a system controller device, the interrupt controller comprising:

a number N of first level interrupt registers, each having a number M of bits, each bit corresponding to a particular interrupt;

a number N of first level mask registers, each having a number M of bits, each bit corresponding to a particular interrupt, each of the N first level mask registers corresponding to one of the N first level interrupt registers and each of the M bits in each of the N first level mask registers corresponding to one of the M bits in the corresponding first level interrupt register;

a number N of first level mask logic devices, each receiving the M bits from a corresponding one of the N first level interrupt registers and the M bits from the corresponding one of the N first level mask registers and outputting a first level signal;

a second level interrupt register having N bits, each for storing the first level signal output by a different one of the first level mask logic devices;

a number X of second level mask registers, the number X corresponding to the number of CPUs coupled to the one or more I/O devices through the system controller device, each of the second level mask registers having a number N of bits; and a number X of second level mask logic devices, each of the X second level mask logic devices receiving the N bits from the second level interrupt register and the N bits from a corresponding one of the X second level mask logic devices and outputting an interrupt indication signal to a corresponding one of the CPUs;

wherein, upon an I/O device detecting an event for which a particular interrupt will be generated by the I/O device, the I/O device generates a memory write transaction to set a particular bit of the M bits of a particular first level register of the N first level registers, the memory write transaction including an address portion for identifying the particular first level interrupt register of the N first level interrupt registers and a data portion for identifying the particular bit of the M bits of the particular first level register that corresponds to the particular interrupt being generated;

wherein a number Y of bits of the data portion of the memory write transaction are used to identify the particular bit of the M bits of the particular first level register that corresponds to the particular interrupt being generated.

13. The interrupt controller of claim 12 wherein the number M is 32 and the number Y is 5.

14. The interrupt controller of claim 13 wherein bits 4:0 of the data portion of the memory write transaction are used to identify the particular bit of the M bits of the particular first level register that corresponds to the particular interrupt being generated.

15. The interrupt controller of claim 14 wherein bits 4:0 of the data portion of the memory write transaction are used to identify one of bits 0 through 31 of the particular first level register that corresponds to the particular interrupt being generated.

16. The interrupt controller of claim 12 wherein each of the N bits of the second level interrupt register identifies one of the N first level interrupt registers and, upon receiving an interrupt indication signal, the associated CPU reads the N bits from the second level interrupt register to identify which of the N first level interrupt registers has at least one of its M bits set.

17. The interrupt controller of claim 16 wherein the associated CPU reads the M bits of the identified one of the N first level interrupt registers to identify at least one interrupt that corresponds to at least one set bit in the identified one of the N first level interrupt registers.

18. The interrupt controller of claim 12 wherein each of the one or more CPUs prevents the notification of the presence of particular interrupts generated by the one or more I/O devices to itself or others of the one or more CPUs by setting bits in the first level mask registers that correspond to bits in corresponding first level interrupt resisters that identify the particular interrupts.

19. The interrupt controller of claim 12 wherein each of the one or more CPUs prevents the notification of the presence of interrupts generated in one of the first level interrupt registers by the one or more I/O devices to itself by setting one of the N bits in the second level mask register associated with the CPU, that corresponds to the first level interrupt register whose interrupts are to be prevented from being made known to the CPU.

20. The interrupt controller of claim 12 wherein the number Y of bits are the least significant bits of the data portion of the memory write transaction, and the number Y is determined by the equation:

$$Y = \frac{\log M}{\log 2}.$$

21. An interrupt controller for interrupts generated by one or more I/O devices to one or more CPUs coupled to the one or more I/O devices through a system controller device, the interrupt controller comprising:
- a number N of first level interrupt registers, each having a number M of bits, each bit corresponding to a particular interrupt;
- a number N of first level mask registers, each having a number M of bits, each bit corresponding to a particular interrupt, each of the N first level mask registers corresponding to one of the N first level interrupt registers and each of the M bits in each of the N first level mask registers corresponding to one of the M bits in the corresponding first level interrupt register;
- a number N of first level mask logic devices, each receiving the M bits from a corresponding one of the N first level interrupt registers and the M bits from the corresponding one of the N first level mask registers and outputting a first level signal;
- a second level interrupt register having N bits, each for storing the first level signal output by a different one of the first level mask logic devices;
- a number X of second level mask registers, the number X corresponding to the number of CPUs coupled to the one or more I/O devices through the system controller device, each of the second level mask registers having a number N of bits; and
- a number X of second level mask logic devices, each of the X second level mask logic devices receiving the N bits from the second level interrupt register and the N bits from a corresponding one of the X second level mask logic devices and outputting an interrupt indication signal to a corresponding one of the CPUs;
- wherein the state of each of the N bits in the second level interrupt register, as set by the first level signal output by each first level mask logic devices, is based on the states of the M bits in each corresponding first level interrupt register and the corresponding M bits in the corresponding first level mask register; and
- wherein the state of the interrupt indication signal output by each of the second level mask logic devices is based on the states of the N bits in the corresponding second level mask register and the N bits in the second level interrupt register;
- wherein, upon an I/O device detecting an event for which a particular interrupt will be generated by the I/O device, the I/O device generates a memory write transaction to set a particular bit of the M bits of a particular first level register of the N first level registers, the memory write transaction including an address portion for identifying the particular first level interrupt register of the N first level interrupt registers and a data portion for identifying the particular bit of the M bits of the particular first level register that corresponds to the particular interrupt being generated; and
- wherein a number Y bits of the data portion of the memory write transaction are used to identify the particular bit of the M bits of the particular first level register that corresponds to the particular interrupt being generated.

22. The interrupt controller of claim 21 wherein the number Y bits are the least significant bits of the data portion of the memory write transaction, and the number Y is determined by the equation:

$$Y = \frac{\log M}{\log 2}.$$

* * * * *